United States Patent

[11] 3,544,781

| [72] | Inventor | Ronald G. Schmidt |
| | | Littleton, Colorado |
| [21] | Appl. No. | 699,217 |
| [22] | Filed | Jan. 19, 1968 |
| [45] | Patented | Dec. 1, 1970 |
| [73] | Assignee | Honeywell Inc. |
| | | a corporation of Delaware |

[54] PHOTOGRAPHIC FLASHGUN
3 Claims, 5 Drawing Figs.

| [52] | U.S. Cl. | 240/1.3 |
| [51] | Int. Cl. | G03b 15/02 |
| [50] | Field of Search | 95/11 |
| | (Lamp); 240/1.3, 37, 37.1, 41.2, 53 |

[56] References Cited
UNITED STATES PATENTS

| 2,976,398 | 3/1961 | McKee et al. | 240/1.3 |
| 2,976,511 | 3/1961 | Lipsitz | 240/1.3X |
| 3,400,261 | 9/1968 | Jacob | 240/1.3 |
| 3,430,546 | 3/1969 | Holt | 240/1.3X |
| 3,439,158 | 4/1969 | Sawada | 240/1.3 |

FOREIGN PATENTS

| 1,203,133 | 10/1965 | Germany | 240/1.3 |

Primary Examiner—John M. Horan
Assistant Examiner—Fred L. Braun
Attorneys—Arthur H. Swanson and Lockwood D. Burton ABSTRACT: A flash gun including a housing with a hinged mounting platform having a first and a second flash mounting socket. The sockets are oriented at right angles with respect to each other. The first socket is of the type to receive any of a plurality of conventional individual flash bulbs, and has associated therewith a fanfold or collapsible reflector. The second socket is of the type for receiving multiple flash flashcubes. The mounting platform is arranged to be selectively tilted on its hinge whereby the flash from either conventional bulbs or from cubes may be operated in either the direct lighting mode or the indirect, or bounce, lighting mode.

PATENTED DEC 1 1970
3,544,781
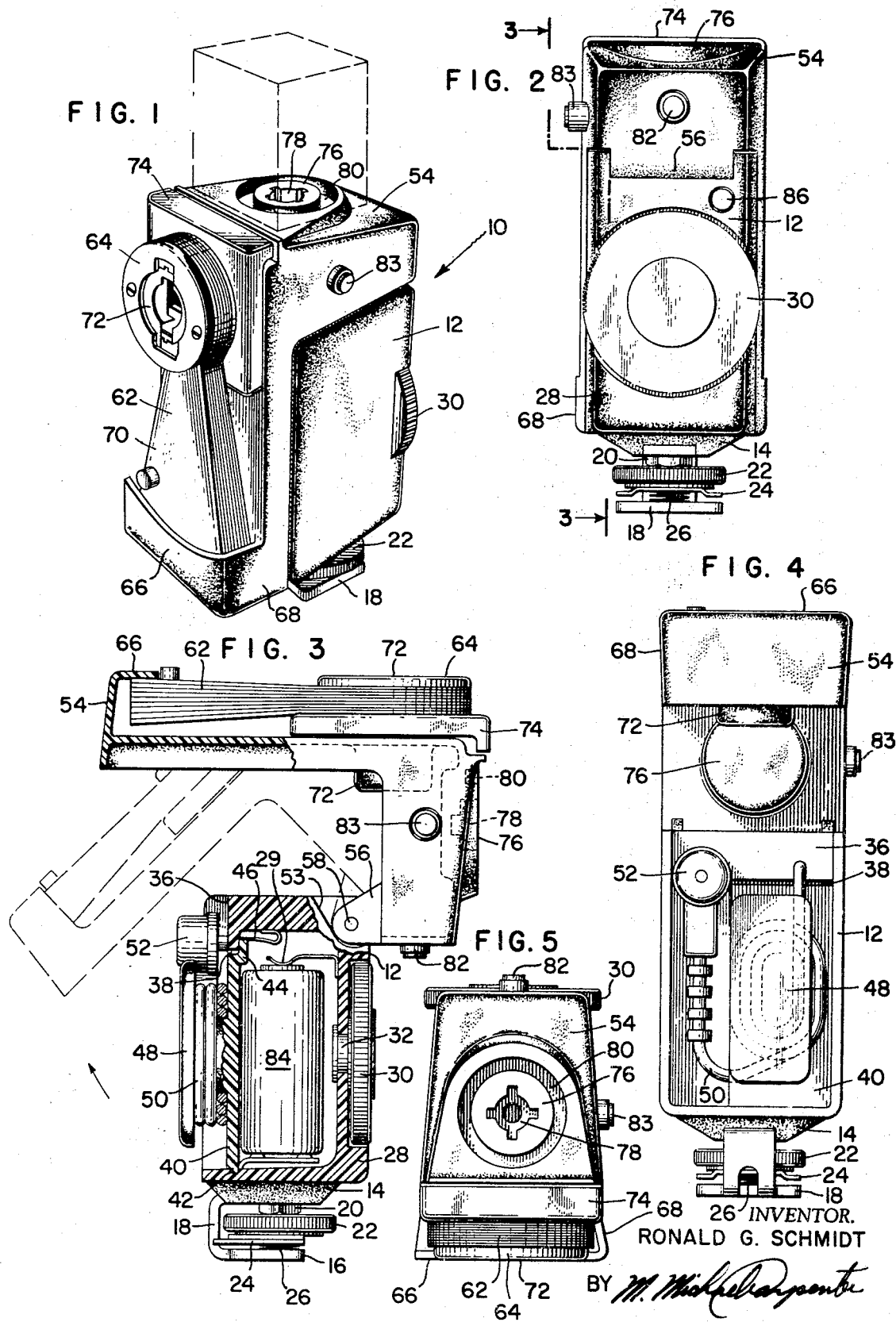

PHOTOGRAPHIC FLASHGUN

The present invention relates to a photographic flashgun and, more particularly, to a flashgun arranged for mounting a plurality of different flashlamp devices, including flashbulbs and flashcubes, upon a hinged platform. The platform may then be tilted for placing the flashlamp devices in suitable angular position for direct or indirect illumination of the subject to be photographed.

It is well known in the prior art to utilize a flashgun which is capable of mounting a flashlamp, such as a flashbulb, within a collapsible reflective device. It is also known to provide this combination with an arrangement which tilts the reflective device for focusing the electromagnetic energy generated during the operation of the flashbulb in various predetermined directions. Further, the use of a flashlamp in the form of a flashcube including a flashbulb and reflector within a single unit is known. However, the utilization of these different devices requires individual adapters and, thereby, restricts the user to providing these adapters or limit his use to one device. As most photographers do not wish to be limited to the use of one flashlamp device, it is desirable to provide a flashgun which is capable of mounting as many flash lamp devices as possible. Such a flashgun should be compact, easily adjusted, and simply operated to substantially reduce the possibility of an operator error.

Accordingly, it is an object of the present invention to provide a flashgun which is capable of mounting a plurality of flashlamp devices including flashbulbs, flashcubes, and other electronic flash devices.

Another object of the invention is to provide a flashgun for mounting a plurality of flashlamp devices which is capable of directing the flash from these devices either directly or indirectly toward a subject which is to be illuminated.

Still another object of the invention provides a flash lamp device mounting arrangement which is easily adjusted and provided with built-in safety features for preventing the operator from making an error during his utilization thereof.

Yet another object of the invention herein presented is to provide a flashgun which is compact for ease of storage, thereby making it more desirable to utilize as an adapter for photographic devices.

A further object of this invention provides a highly stylized flashgun which is arranged for providing a convenient means for storing a collapsible reflector and a shutter cord.

In accomplishing these and other objects of the present invention there is provided a flashgun housing having a mounting platform pivoted thereon for mounting a collapsible reflector. The pivoted mounting platform is provided with a pair of receptacles for receiving a plurality of flashlamp devices, such as flashbulbs or flashcubes. A power source is provided within the housing, and the housing is also arranged for convenient storage of a shutter cord.

Other projects in many of the attendant advantages of the present invention will become readily apparent to those skilled in the art as a better understanding thereof is obtained by reference to the following detailed description when considered in connection with the accompanying drawings, wherein:

FIG. 1 is a perspective view showing the flashgun of the present invention;

FIG. 2 is a rear elevational view of the flashgun;

FIG. 3 is a side elevation, showing the flashgun of the present invention with its mounting platform pivoted 90° upwardly and the housing sectioned along line 3–3 of FIG. 2, the mounting platform is also shown in dash lines pivoted upwardly at 45°;

FIG. 4 is a front elevation of the flashgun shown in FIG. 3 with the pivoted mounting platform tilted upwardly at 90°; and FIG. 5 is a top plan view of the flashgun.

Referring now to the drawings and, more specifically, to FIG. 1, the flashgun is shown generally at 10 having a housing 12 formed in the general shape of a hexahedron. As seen in FIGS. 2 and 3, the base of the housing 12 tapers downwardly for providing a mounting pedestal 14 to which a mounting shoe 16 is attached. The present invention utilizes a mounting shoe 16 having a generally U-shaped member mounted against the pedestal 14. A threaded shaft, not shown, passes through each leg of the U-shaped foot member 18 and is secured into the mounting pedestal 14 of the housing 12. A nut 20 secures the upper leg of the U-shaped foot member 18 against the mounting pedestal 14. A threaded locking ring 22 is positioned upon the threaded shaft between the legs of the generally U-shaped foot member 18. A clip member 24 is urged against the locking ring 22 and away from the lower leg of the generally U-shaped foot member 18 by a spring 26. The lower leg of the U-shaped foot member slides into a contiguous fitting with an accessory mounting clip, such as that found on most cameras. After the lower leg of the U-shaped foot member 18 is placed within the accessory clip, the threaded locking ring 22 is rotated forcing the clip member 24 against the accessory clip and, thereby, securing the flashgun to the camera.

The hexahedral housing 12 is formed with its back surface or wall 28 narrower than its front surface and its side surfaces outwardly tapering from the back toward the front. Each surface of the hexahedral housing 12 is formed by a thin molded wall member which, in turn, form a hollow inner cavity 29. The back surface 28 of the housing is provided with a shallow recessed portion which receives a dial 30 utilized for indicating exposure. The dial 30 is provided with a tubular central shaft portion 32 which extends from its back surface through the back wall 28 of the housing into the hollow inner cavity 29. The dial 30 attaches to the housing 12 by deforming the tubular portion 32 for outwardly expanding its diameter against the inner surface of the back wall 28, as by spinning.

As best seen in FIG. 3, the front wall 36 of the housing 12 is recessed from the front edges of the side walls and relieved at 38 for providing access into the inner cavity 29 of the housing 12. A door 40 fits into the relieved portion 38 for closing the opening within the front surface 36 and completing the closure of the inner cavity 29. The lower edge of the door is relieved along its full length for forming a tab 42 which engages a groove formed across the inner lower surface of the base of the housing 12. The upper edge of the door 40 is offset at 44 and arranged to confront the back surface of the front wall 36 when the door 40 is inserted into its closure position. A spring 46 is provided for urging the door 40 downwardly, thus forcing the tab 42 into the groove within the inner surface of the housing base. A cleat 48 mounts on the front surface of the door 40 to provide a handle therefore and a storage area for a shutter cord 50. The cleat is offset upon the front surface of the door for allowing the shutter cord clearance when wound thereon. A molded connecter 52, located at the end of the storage cord 50, is temporarily mounted upon a pin, not shown, which is affixed to the front wall 36 of the housing 12. When the flashgun 10 is to be used in combination with a camera, the shutter cord 50 is removed from its storage position and the connecter 52 attached to the camera.

The upper wall of the housing 12 is relieved along its backmost edge for forming a hinge receptacle 13 thereon. A pivotal mounting platform 54 having a generally L-shaped crossed section is provided with an extended hinge portion 56 on the inner, end surface of its shorted leg. This extended hinge portion 56 fits into the relieved hinge receptacle 53 provided in the backmost edge of the housing 12 and is pivotally secured therein by a hinge pin 58. As best seen in FIG. 1, the front surface of the flashgun 10 is formed by the outer surface of the longest leg of the L-shaped pivotal mounting platform 54. A cylindrical mounting base, not shown, extends from the outer surface of the L-shaped mounting platform 54 for receiving a plurality of blades or leaves which form a collapsible reflector 62. A plate 64 is then attached to the base of the reflector housing, as by screws. The lower portion of the longest leg of the L-shaped pivotal mounting platform 54 is provided with a channeled portion 66 which extends outwardly from the outer surface thereof and provides a retainer for the plurality of blades which form the collapsible reflector 62. The channeled portion 66 is provided with a closure piece 68 at its nearest end, FIG. 1, while the opposite end thereof is open. The collapsible reflector 62 is erected by rotating the first blade 70 thereof in a clockwise direction while the remaining blades spread out and follow behind in a fanlike manner. The last blade is also rotatably attached to the mounting platform 54 and arranged to follow the first blade 70 in a clockwise direction. A stop, not shown, is provided for retaining the last blade in a fixed position after it clears the channeled portion 66. After a clockwise rotation of 350 plus degrees, to clear the channel portion 66, the first blade 70 is joined to the last blade by placing a tab on the first blade within a slot in the last blade. As the first and last blades are joined, a series of straps which continuously connect each adjoining blade pull the collapsible reflector 62 into its operative conical configuration.

Located in the center of the mounting boss and, in turn, the collapsible reflector 62 is an automatic socket 72 adaptable for receiving a plurality of flashlamp devices, such as flashbulbs including, but not limited to, those known in the trade as the AG-1 and M-2 type. The utilization of an automatic socket for receiving a plurality of various sized flashbulbs is well known in the art, see for example U.S. Pat. Nos. 2,920,301 and 2,984,810 by K. Kawate. After a flashbulb is inserted into the automatic socket 72 it may be removed by depressing an ejector plate 74 which forms the rectangular housing behind the collapsible reflector 66.

The outer portion of the shorter leg of the L-shaped pivotal mounting platform 54 is provided with a second socket 76 which is arranged for receiving cubic flashlamp devices, such as flashcubes or other similar devices of the electronic permanent flash type. The second socket 76 includes a central opening 78 formed in the shape of a quadrate cross having a circular center portion. A toroidally shaped groove 80 surrounds the central opening 78 for receiving the contacts on the cubic flashlamp device. After a flashcube is inserted into the second socket 76 it may be removed by depressing the ejector button 82 located on the end surface of the shortest leg of the L-shaped pivotal mounting plate. An index button 83 is provided to operate a ratchet mechanism which rotates the flashcube 90° after each use.

In operation, a flashbulb or a flashcube is inserted into its respective socket 72 or 76. A battery 84, located within the inner cavity 29, provides the electrical energy which operates the flashlamp device. The shutter cord is then unwound from its cleat 48 and connected to a suitable switch connecter such as a typical plug type connecter operated by the actuation of a camera shutter. A test button or open flash indicator 86 is provided for checking the flashlamp device and battery for determining their operative condition. If the translucent material forming the test button does not glow when depressed, the flashlamp device or battery may be defective and should be replaced. Once the camera is readied and the subject is chosen the dial 30 on the back surface of the housing 12 may be utilized to determine the proper setting of the f stop based on the lamp-to-subject distance, the type of flashlamp device, and the photographic film utilized. If it is desired to illuminate the subject directly, the pivotal mounting plate 54 is positioned as shown in FIG. 1. However, if it is desired to illuminate the subject by indirect lighting, the pivotal mounting plate 54 may be tilted upwardly to the desired angle, as illustrated in FIG. 3, for tilting either the flashbulb or flashcube device.

Thus, in the present invention, it is apparent that there has been provided a flashgun which is capable of mounting a plurality of flash lamp devices, including flashbulbs and flashcubes, within the same apparatus. Further, there has been provided a means for tiling the apparatus and utilizing the illumination from these flashlamp devices in a direct or indirect manner.

Obviously, many modifications and variations of the present invention will become apparent to those skilled in the art, in light of the above teachings, and it should therefore be understood that the embodiments described hereinabove are illustrations rather than limitations of the scope of the present invention. Consequently, the present invention should be limited only by the appended claims.

I claim:

1. An electronic flashgun for holding and operating a plurality of electric flashlamp devices, comprising:
housing means;
mounting means pivotally attached to said housing means;
first socket means mounted on said mounting means;
collapsible reflector means mounted on said mounting means and arranged about said first socket means;
second socket means mounted upon said mounting means and oriented at a right angle with respect to said first socket means;
said mounting means and socket means arranged to hold any of a plurality of individual type of electric flashlamp devices within said first socket means and to hold a multiple flash type of electric flash lamp device within said second socket means; and
said mounting means being pivotally arranged for selectively tilting said electric flashlamp devices to either direct or indirect illuminating positions.

2. An electronic flashgun for holding and operating a plurality of electric flashlamp devices comprising:
housing means;
mounting means, having first and second mounting surfaces angularly arranged on with respect to the other, pivotally attached to said housing means;
first socket means positioned upon said first mounting surface of said mounting means and arranged for holding said flashlamp devices in the form of flashbulbs;
second socket means positioned upon said second mounting surface of said mounting means and arranged for holding said flashlamp devices of the cubic form;
said mounting means being further arranged for tilting said flashlamp devices to either direct or indirect illumination positions;
said housing means having a hexahedral form with one of its hexahedral surfaces recessed;
said mounting means having a general L-shape with the shorter leg thereof pivoted from a second surface of said hexahedral housing;
said second surface of said hexahedral housing joining said recessed surface thereof;
the longer leg of said L-shaped mounting means forming a compartment with said recessed surface of said hexahedral housing when said mounting means is pivoted into a closed relation with said housing means;
storage means within said compartment; and
cord means wrapped upon said storage means within said compartment, whereby said compartment provides unobtrusive, accessible storage for said cord means.

3. An electronic flashgun for holding and operating a plurality of electric flashlamp devices as claimed in claim 2, wherein said first and second mounting surfaces of said mounting means are arranged at a right angle to each other.